United States Patent
Nishitani et al.

(10) Patent No.: US 9,956,950 B2
(45) Date of Patent: May 1, 2018

(54) NON-THERMAL REFINED SOFT-NITRIDED COMPONENT

(71) Applicant: NIPPON STEEL & SUMITOMO METAL CORPORATION, Tokyo (JP)

(72) Inventors: Shigefumi Nishitani, Tokyo (JP); Motoki Takasuga, Tokyo (JP); Hitoshi Matsumoto, Tokyo (JP); Tatsuya Hasegawa, Tokyo (JP); Masato Yuya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 287 days.

(21) Appl. No.: 14/768,260

(22) PCT Filed: Dec. 13, 2013

(86) PCT No.: PCT/JP2013/083439
§ 371 (c)(1),
(2) Date: Aug. 17, 2015

(87) PCT Pub. No.: WO2014/136348
PCT Pub. Date: Sep. 12, 2014

(65) Prior Publication Data
US 2015/0376763 A1   Dec. 31, 2015

(30) Foreign Application Priority Data

Mar. 7, 2013 (JP) .................................. 2013-045234

(51) Int. Cl.
| | | |
|---|---|---|
| *C22C 38/00* | (2006.01) | |
| *B60W 10/26* | (2006.01) | |
| *B60W 10/24* | (2006.01) | |
| *B60W 20/00* | (2016.01) | |
| *C21D 9/00* | (2006.01) | |
| *C21D 9/30* | (2006.01) | |
| *C22C 38/60* | (2006.01) | |
| *C21D 1/06* | (2006.01) | |
| *C22C 38/02* | (2006.01) | |
| *C22C 38/20* | (2006.01) | |
| *C22C 38/22* | (2006.01) | |
| *C22C 38/28* | (2006.01) | |
| *C22C 38/38* | (2006.01) | |
| *C22C 38/42* | (2006.01) | |
| *C22C 38/58* | (2006.01) | |

(52) U.S. Cl.
CPC ............ *B60W 10/26* (2013.01); *B60W 10/24* (2013.01); *B60W 20/00* (2013.01); *C21D 1/06* (2013.01); *C21D 9/00* (2013.01); *C21D 9/30* (2013.01); *C22C 38/00* (2013.01); *C22C 38/001* (2013.01); *C22C 38/02* (2013.01); *C22C 38/20* (2013.01); *C22C 38/22* (2013.01); *C22C 38/28* (2013.01); *C22C 38/38* (2013.01); *C22C 38/42* (2013.01); *C22C 38/58* (2013.01); *C22C 38/60* (2013.01)

(58) Field of Classification Search
CPC .................................. C22C 38/38; C21D 9/30
See application file for complete search history.

(56) References Cited

FOREIGN PATENT DOCUMENTS

| | | | |
|---|---|---|---|
| CN | 1685073 | | 10/2005 |
| JP | 02153042 | A * | 6/1990 |
| JP | 2000-160287 | | 6/2000 |
| JP | 2002-030339 | | 1/2002 |
| JP | 2002-180194 | | 6/2002 |
| JP | 2002-226939 | | 8/2002 |
| JP | 2007-177309 | | 7/2007 |
| JP | 2010-242170 | | 10/2010 |
| JP | 2011-042846 | | 3/2011 |
| JP | 2012-026005 | | 2/2012 |

OTHER PUBLICATIONS

English machine translation of JP 2002030339 A of Fukuzumi et al., published on Jan. 31, 2002.*
English machine translation of JP 2010242170 A of Fujii et al., published on Oct. 28, 2010.*

* cited by examiner

*Primary Examiner* — Roy V King
*Assistant Examiner* — Jophy S. Koshy
(74) *Attorney, Agent, or Firm* — Clark & Brody

(57) ABSTRACT

Provided is a non-thermal refined soft-nitrided component including chemical composition of a steel material of a base metal containing: in mass %, C: 0.25 to 0.40%; Si: 0.10 to 0.35%; Mn: more than 2.0% to 2.8% or less; N: 0.0030 to 0.0250%; Cu: 0 to 1.0%; Mo: 0 to 0.3%; Ni: 0 to 0.5%; Ti: 0 to 0.020%; and a balance being Fe and impurities, the impurities including P: 0.08% or less; S: 0.10% or less; Al: 0.05% or less; and Cr: less than 0.20%, wherein a Vickers hardness at a position of 0.05 mm from the surface is 400 to 480, a Vickers hardness at a position of 1.0 mm from the surface is 200 or more, and a compound-layer depth at a stress concentrated region is 5 μm or less. This non-thermal refined soft-nitrided component has an excellent bending straightening property and a high fatigue strength.

3 Claims, 2 Drawing Sheets

NON-THERMAL REFINED SOFT-NITRIDED COMPONENT

TECHNICAL FIELD

The present invention relates to a non-thermal refined soft-nitrided component. Specifically, the present invention relates to a non-thermal refined soft-nitrided component having a high bending fatigue strength and an excellent bending straightening property, produced by being subjected to a soft-nitriding treatment without being subjected to a thermal refining treatment of quenching-tempering after being forged and machined into a predetermined shape, such as a crankshaft or a connecting rod used in automobiles, industrial machines, and construction machinery, etc. More specifically, the present invention relates to a non-thermal refined soft-nitrided component having an excellent bending straightening property and a high bending fatigue strength of 750 MPa or more in a bending fatigue test.

The "non-thermal refined soft-nitrided component" denotes a component subjected to a soft-nitriding treatment without being subjected to a "quenching-tempering treatment" that is a so-called "thermal refining treatment" after being machined. In the following description, the "component subjected to the soft-nitriding treatment" is referred to simply as a "soft-nitrided component".

BACKGROUND ART

In production of automobile components that require a high fatigue strength and a high wear resistance, treatments, such as an induction hardening treatment and a soft-nitriding treatment that are a casehardening treatment, are carried out after forging and machining in most cases.

The "soft-nitriding treatment" performs a cementation treatment on nitrogen and carbon at a temperature of an $A_1$ transformation point or less, and has such major characteristics that have a low heat-treatment temperature and a smaller heat treatment strain than that in the "induction hardening treatment". A "compound layer" (layer formed of precipitated nitride such as $Fe_3N$) observed as a white portion through etching using nital is formed in a surface layer of the component subjected to the soft-nitriding treatment. A "diffusion layer" is formed between the above compound layer and a base metal (base material).

The soft-nitriding treatment causes a small heat treatment strain, but cannot eliminate this strain, and thus brings not a small bad influence on dimensional accuracy. Particularly, even a slight deterioration of dimensional accuracy becomes a crucial matter in a crankshaft or the like that is a rotational shaft component. Hence, it is required to perform bending-straightening after the soft-nitriding treatment so as to improve the dimensional accuracy.

Unfortunately, cracks may be generated from the surface layer if the soft-nitrided component is subjected to the bending-straightening. Hence, a soft-nitrided component, such as a crankshaft, is required to experience no cracks even if being subjected to bending-straightening, that is, to have an excellent bending straightening property as well as a high bending fatigue strength.

In the following description, the soft-nitrided component may be represented by a crankshaft in some cases.

Because of current demand for consideration to the environments, a crankshaft that is a major component of an engine is also oriented to reduction in weight and size without exclusion, and has been required to have an extremely high bending fatigue strength of 750 MPa or more, for example.

In the light of cost reduction, resource saving, and others, there has been increased demand for a non-thermal refined crankshaft without being subjected to a "quenching-tempering treatment" (thermal refining treatment) during the production thereof.

In order to secure the above bending fatigue strength of 750 MPa or more in a non-thermal refined crankshaft, it is required to set hardness at a position of 0.05 mm from the surface of the component (also referred to as a "surface-layer hardness", hereinafter) to be at least 400 or more in terms of a Vickers hardness (referred to as a "HV hardness", hereinafter) after the soft-nitriding treatment.

However, in the case of setting the HV hardness at a position of 0.05 mm from the surface of the crankshaft to be 400 or more, cracks are likely to be generated in the surface layer if the bending straightening is performed. Conducting a bending fatigue test on such a crankshaft results in fatigue fractures initiated from the above cracks.

In addition, as described above, there has been increased demand for further reduction in weight of a crankshaft, and thus further more flexibility has been required in crankshaft shape designing. Consequently, steel material for a crankshaft is required to have a bending straightening property high enough for a crankshaft having a shape likely to exhibit a greater bending than that in a conventional art during the soft-nitriding to be bending-straightened.

Accordingly, there has been extremely strong demand for a crankshaft having a sufficient bending straightening property in addition to a bending fatigue strength as high as 750 MPa or more.

To meet the above demand, for example, Patent Document 1 discloses a "non-thermal refined steel for soft-nitriding", wherein the steel contains, in mass %, C: 0.2 to 0.6%, Si: 0.05 to 1.0%, Mn: 0.25 to 1.0%, S: 0.03 to 0.2%, Cr: 0.2% or less, s-Al: 0.045% or less, Ti: 0.002 to 0.010%, N: 0.005 to 0.025%, and 0: 0.001 to 0.005%, and further contains one or more types of elements selected from Pb: 0.01 to 0.40%, Ca: 0.0005 to 0.0050%, and Bi: 0.005 to 0.40% if necessary, satisfies conditions: 0.12×Ti %<O %<2.5×Ti %, and 0.04×N %<O %<0.7×N %, and includes a balance made of Fe and unavoidable impurities, wherein a micro-structure after hot forging is a mixed structure of ferrite and perlite.

Patent Document 2 discloses a "crankshaft" made of a steel whose surface is subjected to a nitriding treatment or a soft-nitriding treatment, the crankshaft including a pin section and a journal section, wherein the steel contains, as an alloy element, C: 0.07 mass % or more to 0.12 mass % or less, Si: 0.05 mass % or more to 0.25 mass % or less, Mn: 0.1 mass % or more to 0.5 mass % or less, Cu: 0.8 mass % or more to 1.5 mass % or less, Ni: 2.4 mass % or more to 4.5 mass % or less, Al: 0.8 mass % or more to 1.5 mass % or less, Ti: 0.5 mass % or more to 1.5 mass % or less, and further contains one or more types of elements selected from S: 0.01 mass % or more to 0.10 mass %, Ca: 0.0010 mass % or more to 0.0050 mass % if necessary, and includes a balance made of Fe and unavoidable impurities; and each steel specimen taken from a center part of the steel that is affected by no influence of the nitriding treatment is subjected to a solid solution treatment at 1200° C. for one hour, and thereafter, is cooled at an appropriate cooling speed of 0.3° C./seconds or more to 1.5° C./seconds or less within a temperature range from 900° C. or more to 300° C. or less, thereby setting a ratio of bainite in the steel micro-structure to be 80% or more, and setting the HV hardness to be 200 or more to 300 or less; each internal hardness of the pin section and the journal section that are subjected to the nitriding treatment or the soft-nitriding treatment is set to be 350 or more to 500 or less in terms of the HV hardness; and the HV hardness at a position of 0.05 mm from the surface is 650 or more to 950 or less.

In Patent Document 3, the present inventors have proposed a "non-thermal refined nitrided crankshaft" wherein a steel material of a base metal contains, in mass %, C: 0.25 to 0.60%, Si: 0.10 to 1.0%, Mn: 0.60 to 2.0%, P: 0.08% or less, S: 0.10% or less, Al: 0.05% or less, Cr: 0.20 to 1.0%, and N: 0.0030 to 0.0250%, includes a balance made of Fe and impurities, and satisfies 40-C+2Mn+5.5Cr≤43.0; and the HV hardness at a depth of 0.05 mm from the surface is 380 to 600, and at least each of a pin fillet section, a journal fillet section, and a pin section has a compound-layer depth of 5 μm or less.

This non-thermal refined nitrided crankshaft may further contain one or more types of elements selected from Cu, Ni, Mo, V, Ti, and Ca, and in this case, it is necessary to satisfy [40-C+2Mn+5.5Cr+26Mo≥43.0].

In Patent Document 4, the present inventors have further proposed a "thermal refined soft-nitrided component", wherein a steel material of a base metal contains, in mass %, C: 0.25 to 0.40%, Si: 0.10 to 0.35%, Mn: 0.60 to 1.0%, P: 0.08% or less, S: 0.10% or less, Al: 0.05% or less, Cr: 0.30 to 1.10%, and N: 0.0030 to 0.0250%, and includes a balance made of Fe and impurities; and the HV hardness at a position of 0.05 mm from the surface is 400 to 600, and a compound-layer depth at a stress concentrated region is 5 μm or less.

The thermal refined nitrided component may further contain one or more types of elements selected from Cu, Mo, V, Ni, and Ti.

LIST OF PRIOR ART DOCUMENTS

Patent Document
　Patent Document 1: JP2002-226939A
　Patent Document 2: JP2007-177309A
　Patent Document 3: JP2012-26005A
　Patent Document 4: JP2011-42846A

DISCLOSURE OF THE INVENTION

Problems to be Solved by the Invention

With the composition in the invention of Patent Document 1, it is hard to attain a sufficient surface-layer hardness. Hence, the bending fatigue strength is too low to satisfy 750 MPa, as shown in an embodiment of Patent Document 1.

With the composition in the invention of Patent Document 2, the surface-layer hardness after the soft-nitriding treatment becomes too high, as shown in an embodiment thereof. Hence, it is hard to tell that a sufficient bending straightening property is secured during performing the bending straightening treatment.

With the composition in the invention of Patent Document 3, it is possible to attain a high fatigue strength and a high bending straightening property, as shown in an embodiment thereof. However, a crankshaft has been oriented to reduction in weight and size, and requires more severe fatigue strength and bending straightening property.

The thermal refined soft-nitrided component disclosed in Patent Document 4 is excellent in bending straightening property after the soft-nitriding treatment, and has a bending fatigue strength as high as 800 MPa or more in the bending fatigue test. Accordingly, this component is usable as a component, such as a crankshaft, in automobiles, industrial machines, and construction machinery, for example, and contributes to reduction in weight and size. Unfortunately, in the invention of Patent Document 4, subsequent to the machining, a thermal refining treatment of quenching and tempering is required before the soft-nitriding treatment.

An object of the present invention, which has been made in order to solve the problems above, is to provide a non-thermal refined soft-nitrided component excellent in bending straightening property, and having a fatigue strength as high as 750 MPa or more in the bending fatigue test.

Means for Solving the Problems

In order to solve the aforementioned problems, the present inventors have conducted various studies. As a result, the following points 1) to 7) were found.

1) A thin sheet specimen was collected from a surface layer of each steel material subjected to the soft-nitriding treatment, and a tension test was conducted on each specimen; and as a result, specimens whose compound layers were removed exhibited greatly enhanced tension in the tension test, compared with that of specimens whose compound layers were not removed.

2) As a result of observation on a fracture surface of each thin sheet specimen after the tension test, the specimens whose compound layers were not removed had fracture surfaces where brittle fractures were generated in the compound layers, thus initiating cracking; contrary to this, the specimens whose compound layers were removed had ductility fracture surfaces.

3) If the compound layer in the surface layer of the steel material subjected to the soft-nitriding treatment is removed, the fracture morphology during the bending-straightening is changed from the brittle fractures starting from the compound layer to the ductility fractures. Accordingly, it is possible to enhance the bending straightening property of the soft-nitrided component.

4) Meanwhile, in the bending fatigue strength, there is little difference between before and after the removal of the compound layer. In the case of the non-thermal refined soft-nitrided component, if the hardness at a position of 0.05 mm from the component surface is 400 or more in terms of the HV hardness, and if the hardness at a position of 1.0 mm from the component surface (also referred to as an "internal hardness", hereinafter) is 200 or more in terms of the HV hardness, it is possible to stably attain a high bending fatigue strength of 750 MPa or more.

5) In the non-thermal refined component, an endurance ratio (fatigue strength/tensile strength) of the base metal is lower than that in the thermal refined component. Therefore, the non-thermal refined component has a lower fatigue strength of the base metal than that of the thermal refined component even if the non-thermal refined component has an internal hardness equivalent to that of the thermal refined component. Particularly, if the non-thermal refined soft-nitrided component has an internal hardness of less than 200 in terms of the HV hardness, in spite of having a high surface-layer hardness of 400 or more in terms of the HV hardness, fractures initiated from the internal part are caused in the fatigue test, which makes it hard to attain a fatigue strength as high as 750 MPa or more.

6) It is possible to substantially secure a sufficient bending straightening property by removing the compound layer in the surface layer of the soft-nitrided component even if the surface-layer hardness after the soft-nitriding treatment is 400 or more in terms of the HV hardness.

7) However, in the case of a crankshaft shape that requires a high bending straightening property, if the surface-layer hardness of the soft-nitrided component becomes more than 480 in terms of the HV hardness, it may be hard to attain a sufficient bending straightening property even if the compound layer is removed.

The present invention has been accomplished based on the above findings, and the gist lies in a non-thermal refined soft-nitrided component as follows.

(1) A non-thermal refined soft-nitrided component having a compound layer in a surface layer of a steel material of a base metal, chemical composition of the steel material of the base metal containing: in mass %, C: 0.25 to 0.40%; Si: 0.10 to 0.35%; Mn: more than 2.0% to 2.8% or less; N: 0.0030 to 0.0250%; Cu: 0 to 1.0%; Mo: 0 to 0.3%; Ni: 0 to 0.5%; Ti: 0 to 0.020%; and a balance being Fe and impurities, the impurities including P: 0.08% or less; S: 0.10% or less; Al: 0.05% or less; and Cr: less than 0.20%, wherein an HV hardness at a position of 0.05 mm from the surface is 400 to 480, an HV hardness at a position of 1.0 mm from the surface is 200 or more, and a compound-layer depth at a stress concentrated region is 5 μm or less.

(2) The non-thermal refined soft-nitrided component as set forth in the above (1), wherein the steel material of the base metal contains, in mass %, one or more types of elements selected from Cu: 0.05 to 1.0% and Mo: 0.05 to 0.3%.

(3) The non-thermal refined soft-nitrided component as set forth in the above (1) or (2), wherein the steel material of the base metal contains, in mass %, one or more types of elements selected from Ni: 0.05 to 0.5% and Ti: 0.005 to 0.020%.

The term "impurities" denotes those impurities which come from ores and scraps as row materials, manufacturing environments, and so on during industrially producing steel materials.

The "stress concentrated region" denotes a region where fatigue fractures are generated due to bending or cracking is caused while carrying out the bending straightening. As a specific example thereof, if the "non-thermal refined soft-nitrided component" is a crankshaft having a shape as shown in FIG. 1, the "stress concentrated region" represents a "pin fillet section" or a "journal fillet section" of the crankshaft.

Advantageous Effects of the Invention

The non-thermal refined soft-nitrided component of the present invention is excellent in bending straightening property after the soft-nitriding treatment, and has a bending fatigue strength as high as 750 MPa or more in the bending fatigue test; therefore, this non-thermal refined soft-nitrided component is usable as a component, such as a crankshaft, in automobiles, industrial machines, and construction machinery, and is capable of realizing reduction in weight and size of components used threrein.

MODE FOR CARRYING OUT THE INVENTION

Figure 1:
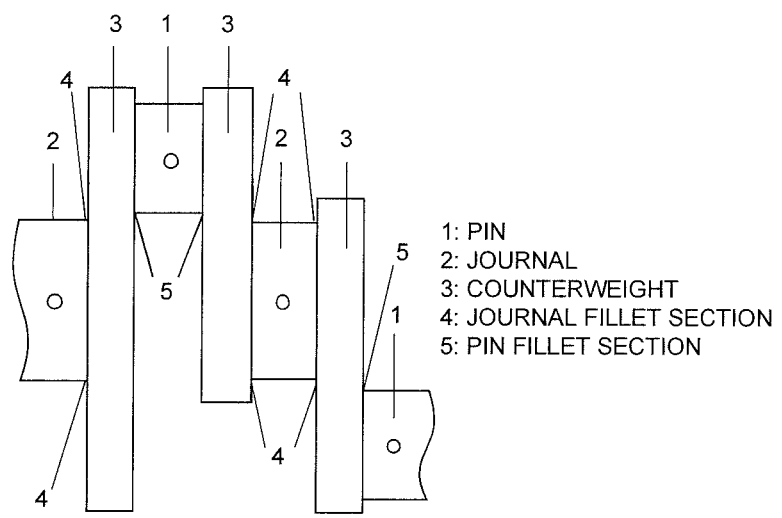
FIG. 1 is a drawing exemplifying a part of a crankshaft as a non-thermal refined soft-nitrided component, and explaining a "pin fillet section" and a "journal fillet section" equivalent to a "stress concentrated region" of the crankshaft.

Each requirement of the present invention will be described in detail, hereinafter. It should be noted that "%" for a content of each element denotes "mass %".

(A) Chemical Composition of Steel Material of Base Metal:

C: 0.25 to 0.40%

C has an action to improve the internal hardness and the surface-layer hardness, and enhance the bending fatigue strength. The C content is required to be 0.25% or more in order to attain a desired bending fatigue strength. However, an excessive C content results in an excessively high surface-layer hardness, so that it is hard to attain a sufficient bending straightening property even if the compound-layer depth at the stress concentrated region is 5 μm or less. Hence, the C content is set to be 0.25 to 0.40%. The C content is preferably 0.28% or more, and preferably 0.38% or less.

Si: 0.10 to 0.35%

Si is an element necessary for deoxidation during melting the steel, and the Si content of at least 0.10% is required for obtaining the above effect. However, an excessive content of Si causes excessive deterioration of the bending straightening property even if the compound-layer depth at the stress concentrated region is 5 μm or less. Hence, the Si content is set to be 0.10 to 0.35%. The Si content is preferably 0.15% or more, and preferably 0.30% or less.

Mn: more than 2.0% to 2.8% or less

Mn is an element having a deoxidizing action similar to Si. Mn also has an action to improve the internal hardness, and increase a solute nitrogen content in the surface layer during the soft-nitriding to improve the surface-layer hardness, thereby enhancing the bending fatigue strength. In order to exert this effect, the Mn content is required to be more than 2.0%. On the other hand, the Mn content of more than 2.8% causes an excessively high surface-layer hardness, which excessively deteriorates the bending straightening property even if the compound-layer depth at the stress concentrated region is 5 μm or less. Accordingly, the Mn content is set to be more than 2.0% to the 2.8% or less. The Mn content is preferably 2.2% or more, and preferably 2.7% or less.

N: 0.0030 to 0.0250%

N is an element to improve the bending fatigue strength and the bending straightening property. In order to attain this effect, the N content is required to be 0.0030% or more. On the other hand, the N content of more than 0.0250% rather saturates this effect. Accordingly, the N content is set to be 0.0030 to 0.0250%. The N content is preferably 0.0080% or more, and preferably 0.0220% or less.

One of the steel materials of the base metal of the non-thermal refined soft-nitrided component according to the present invention contains the C to N elements, and a balance made of Fe and impurities, wherein P, S, Al, and Cr among the impurities are set such that P: 0.08% or less, S: 0.10% or less, Al: 0.05% or less, and Cr: less than 0.20%.

P: 0.08% or less

P is an impurity contained in the steel, and deteriorates the bending fatigue strength. Particularly, the P content of more than 0.08% significantly deteriorates the bending fatigue strength. Accordingly, the P content is set to be 0.08% or less. It is preferable to set the P content to be 0.04% or less.

S: 0.10% or less

S is an impurity contained in the steel. An effect to improve machinability can be attained by actively containing S. However, the S content of more than 0.10% significantly deteriorates the bending fatigue strength and the bending straightening property. Accordingly, the S content is set to be 0.10% or less. It is preferable to set the S content to be 0.08% or less. In order to attain the effect to improve machinability, it is preferable to set the S content to be 0.04% or more.

Al: 0.05% or less

Al is an impurity contained in the steel. An excessive Al content deteriorates the bending straightening property. Particularly, the S content of more than 0.05% significantly deteriorates the bending straightening property even if the compound-layer depth at the stress concentrated region is 5 μm or less. Accordingly, the Al content is set to be 0.05% or less. The Al content is preferably 0.03% or less.

Cr: less than 0.20%

Cr is an impurity contained in the steel. Containing Cr may excessively increase the surface-layer hardness, which deteriorates the bending straightening property; thus it is preferable to set the Cr content to be as small as possible. Accordingly, the Cr content is set to be less than 0.20%. The Cr content is preferably 0.10% or less.

Another of the steel materials of the base metal of the non-thermal refined soft-nitrided component according to the present invention contains one or more types of elements selected from Cu, Mo, Ni, and Ti instead of part of Fe.

Each operational effect of Cu, Mo, Ni, and Ti that are optional elements, and a reason for limitation of each content will be described, hereinafter.

Cu and Mo may be contained for the purpose of enhancing the bending fatigue strength. Detailed description regarding this will be provided as below.

Cu: 0 to 1.0%

Cu is an element to improve the internal hardness, and enhance the bending fatigue strength. Hence, Cu may be contained. However, the Cu content of more than 1.0% deteriorates hot workability. Accordingly, the amount of Cu to be contained is set to be 1.0% or less. The amount of Cu is preferably 0.4% or less, and more preferably 0.3% or less.

In order to stably attain the above effect, it is preferable to set the amount of Cu to be 0.05% or more, and more preferably 0.1% or more.

Mo: 0 to 0.3%

Mo has an action to strengthen ferrite, and improve the internal hardness to enhance the bending fatigue strength. Hence, Mo may be contained. However, an excessive Mo content of more than 0.3% rather saturates the above effect, only to deteriorate economic efficiency. Accordingly, the amount of Mo to be contained is set to be 0.3% or less. The amount of Mo is preferably 0.2% or less.

In order to stably attain the above effect, the amount of Mo is preferably 0.05% or more, and more preferably 0.1% or more.

Any one type selected from Cu and Mo, or two types selected from Cu and Mo in combination may be contained. The total content of these elements may be 1.30%, and preferably 0.30% or less.

Ni and Ti may be contained for the purpose of enhancing the bending straightening property. Detailed description regarding this will be provided, hereinafter.

Ni: 0 to 0.5%

Ni is an element to improve toughness, and enhance the bending straightening property. Accordingly, Ni may be contained. However, the Ni content of more than 0.5% rather saturates the above effect, only to deteriorate the economic efficiency. Hence, the amount of Ni to be contained is set to be 0.5% or less. The amount of Ni is preferably 0.3% or less, and more preferably 0.2% or less.

In order to stably attain the above effect, the amount of Ni is preferably 0.05% or more, and more preferably 0.08% or more.

In the case of containing Cu, it is likely to cause hot cracking called "Cu checking", and in order to prevent this, it is preferable to contain Cu in combination with Ni in a manner as to satisfy Ni/Cu≥0.5.

Ti: 0 to 0.020%

Ti is an element that forms nitride, and refines grains to hinder propagation of cracking during the bending-straightening, thereby enhancing the bending straightening property. Accordingly, Ti may be contained. However, the Ti content of more than 0.020% generates coarse nitride, and significantly deteriorates the bending straightening property even if the compound-layer depth at the stress concentrated region is 5 μm or less. Accordingly, the amount of Ti to be contained is set to be 0.020% or less. The amount of Ti is preferably 0.015% or less.

In order to stably attain the above effect, the amount of Ti is preferably 0.005% or more.

Any one type selected from Ni and Ti, or two types selected from Ni and Ti in combination may be contained. The total content of these elements may be 0.520%, and preferably 0.30% or less.

(B) Hardness (surface-layer hardness) at a position of 0.05 mm from the surface:

In the non-thermal refined soft-nitrided component according to the present invention, the HV hardness at a position of 0.05 mm from the surface should be 400 to 480.

It is possible to secure a high bending fatigue strength of 750 MPa or more if the HV hardness at a position of 0.05 mm from the surface of the non-thermal refilled soft-nitrided component, that is, the HV hardness in the surface layer is 400 or more, the HV hardness at a position of 1.0 mm from the surface of the component, that is, the HV hardness at the internal part is 200 or more, and the compound-layer depth at the stress concentrated region is 5 μm or less. However, if the HV hardness in the surface layer is more than 480, in the case of using a crankshaft shape to likely cause a greater bending than that of a conventional art during the soft-nitriding, it may be hard to attain a practically sufficient bending straightening property even if the compound-layer depth at the stress concentrated region is 5 μm or less.

Accordingly, in the non-thermal refined soft-nitrided component according to the present invention, the HV hardness at a position of 0.05 mm from the surface is set to be 400 to 480. The HV hardness at a position of 0.05 mm from the surface is preferably 410 or more, and preferably 470 or less.

(C) Hardness (internal hardness) at a position of 1.0 mm from the surface:

In the non-thermal refined soft-nitrided component according to the present invention, the HV hardness at a position of 1.0 mm from the surface of the component should be 200 or more.

In the non-thermal refined soft-nitrided component, since the endurance ratio of the base metal is lower than that in the thermal refined soft-nitrided component, the fatigue strength of the base metal becomes lower than that in the thermal refined soft-nitrided component even if the non-thermal refined soft-nitrided component has an internal hardness equivalent to that of the thermal refined soft-nitrided component. Consequently, in the non-thermal refined soft-nitrided component, in the case of having an HV hardness of less than 200 at the internal part, even if the non-thermal refined soft-nitrided component has an internal hardness equivalent to that of the thermal refined soft-nitrided component, and also has a surface-layer hardness as high as 400 or more in terms of the HV hardness, fatigue fractures initiated from the internal part may be caused, which makes it hard to attain a high fatigue strength of 750 MPa or more.

Accordingly, in the non-thermal refined soft-nitrided component according to the present invention, the HV hardness at a position of 1.0 mm from the surface is set to be 200 or more. The HV hardness at a position of 1.0 mm from the surface is preferably 210 or more, and preferably 320 or less in the light of machinability.

(D) Compound-layer depth at the stress concentrated region:

In the non-thermal refined soft-nitrided component according to the present invention, the compound-layer depth at the stress concentrated region should be 5 μm or less.

By setting the compound-layer depth at the stress concentrated region to be thinner, it is possible to improve the bending straightening property without deteriorating the bending fatigue strength, but it is hard to expect significant improvement of the bending straightening property if the compound layer whose depth is more than 5 μm still remains.

Accordingly, in the non-thermal refined soft-nitrided component according to the present invention, the compound-layer depth at the stress concentrated region is set to be 5 μm or less. The compound-layer depth at the stress concentrated region is preferably 3 μm or less, and it is most preferable to have no compound layer, that is, have a compound-layer depth of 0 μm.

Such a component that satisfies the above (B) to (D) can be obtained by machining a hot forging that satisfies the chemical composition specified by the present invention, for example, and thereafter, subjecting the machined hot forging to the soft-nitriding treatment to retain this hot forging for two hours in an atmosphere where an RX gas and an ammonia gas are mixed at a mixture ratio of 1:1 at a temperature of 600° C., and then cooling the machined hot forging in an oil having a temperature of 90° C., and subsequently, grinding the stress concentrated region through machining using a lapping machine or the like.

The above mentioned "RX gas" is one type of a modified gas, and represents a brand name of this gas.

Specifically, representing a crankshaft as an example of the non-thermal refined soft-nitrided component, for example, this crankshaft can be obtained in such a manner that a starting material that satisfies conditions on the chemical composition specified by the present invention is hot-forged into a crankshaft, this crankshaft is machined, and thereafter this crankshaft is subjected to the soft-nitriding treatment to retain the crankshaft for two hours in an atmosphere where an RX gas and an ammonia gas are mixed at a mixture ratio of 1:1 at a temperature of 600° C., and then cooled in an oil having a temperature of 90° C., and subsequently, the pin fillet section and the journal fillet section are ground through machining using a lapping machine or the like.

The present invention will be described in more detail using Example, hereinafter.

EXAMPLE

Each of Steels A to K having respective chemical compositions shown in Table 1 was melt in a 70 t convertor, subjected to continuous casting, and further subjected to blooming into a cast piece having a cross sectional dimension of 180 mm×180 mm.

Subsequently, each cast piece was hot-forged under the conditions that a heating temperature was 1200° C., and a finishing temperature was 1000 to 1050° C. into a steel bar having a diameter of 90 mm Each steel bar after the hot-forging was cooled in the atmosphere down to a room temperature through allowing cooling.

In Table 1, each of Steels A to G is an example having chemical composition within the range specified by the present invention, and each of Steels H to K is an example having chemical composition out of the range specified by the present invention.

TABLE 1

| | Chemical composition (mass %) Balance: Fe and impurities | | | | | | | | | | | |
|---|---|---|---|---|---|---|---|---|---|---|---|---|
| Steel | C | Si | Mn | P | S | Cu | Ni | Cr | Mo | Al | Ti | N |
| A | 0.27 | 0.20 | 2.70 | 0.015 | 0.084 | — | — | 0.06 | — | 0.012 | — | 0.0055 |
| B | 0.36 | 0.14 | 2.25 | 0.020 | 0.042 | — | — | 0.14 | — | 0.024 | — | 0.0063 |
| C | 0.30 | 0.25 | 2.50 | 0.014 | 0.060 | — | — | 0.07 | — | 0.019 | 0.010 | 0.0150 |
| D | 0.32 | 0.18 | 2.42 | 0.011 | 0.055 | 0.20 | — | 0.18 | — | 0.008 | — | 0.0095 |
| E | 0.29 | 0.15 | 2.10 | 0.010 | 0.077 | — | 0.10 | 0.14 | — | 0.011 | — | 0.0063 |
| F | 0.32 | 0.14 | 2.48 | 0.012 | 0.061 | 0.18 | 0.08 | 0.18 | — | 0.010 | — | 0.0085 |
| G | 0.31 | 0.21 | 2.10 | 0.011 | 0.062 | — | — | 0.12 | 0.10 | 0.008 | — | 0.0145 |
| H | *0.10 | 0.12 | 2.20 | 0.022 | 0.045 | — | — | 0.10 | — | 0.009 | — | 0.0101 |
| I | 0.37 | 0.11 | *1.25 | 0.010 | 0.044 | — | — | 0.11 | — | 0.005 | — | 0.0122 |
| J | 0.32 | 0.20 | *3.20 | 0.019 | 0.055 | — | — | 0.14 | — | 0.012 | — | 0.0063 |
| K | 0.33 | 0.18 | 2.52 | 0.014 | 0.060 | — | — | *0.34 | — | 0.022 | — | 0.0050 |

A mark (*) represents deviation from the chemical composition specified by the present invention.

Each steel bar having a diameter of 90 mm obtained in this manner was heated up to a temperature of 1200° C., and then hot-forged at a finishing temperature of 1000 to 1050° C. into a steel bar having a diameter of 50 mm. Each finished steel bar was cooled down to a room temperature through allowing cooling in the atmosphere.

Some of the steel bars, each having a diameter of 50 mm in Steel A were further subjected to a normalizing treatment to austenitize the steel bar under the conditions that a heating temperature is 880° C., and a retaining time period is 60 minutes, and subsequently, cool the steel bar in the atmosphere through allowing cooling.

Figure 2:
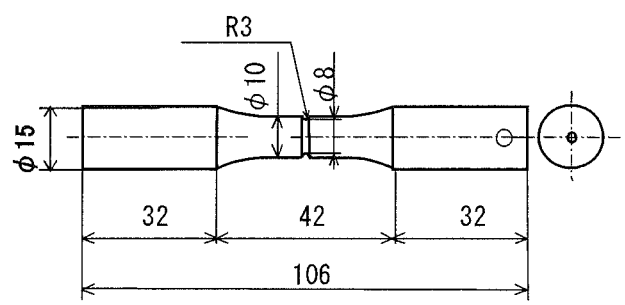
FIG. 2 is a drawing showing a shape of a grooved Ono-type rotating bending fatigue test specimen used in Example; and a unit of measurement in the drawing is "mm".
Figure 3:
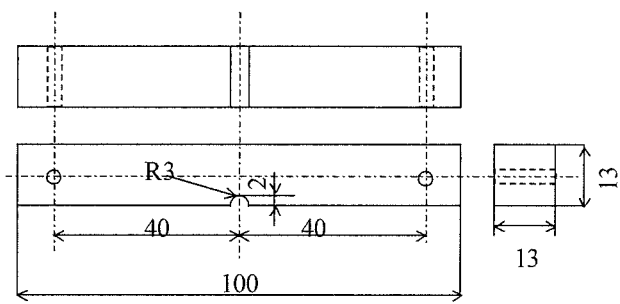
FIG. 3 is a drawing showing a shape of a four-point bending test specimen used in Example; and a unit of measurement in the drawing is "mm".

In each of Steels A to K, a grooved Ono-type rotating bending fatigue test specimen having a shape shown in FIG. 2 was cut out in parallel to the forging axis from an R/2 part ("R" represents a radius of a steel bar) of each steel bar as hot-forged having a diameter of 50 mm, and a four-point bending test specimen having a shape shown in FIG. 3 was also cut out in the same manner as this grooved Ono-type rotating bending fatigue test specimen.

Similarly, in Steel A, a grooved Ono-type rotating bending fatigue test specimen having the shape shown in FIG. 2 was cut out in parallel to the forging axis from the R/2 part of each steel bar having a diameter of 50 mm, which was further subjected to the normalization, and a four-point bending test specimen having a shape shown in FIG. 3 was also cut out in the same manner as this grooved Ono-type rotating bending fatigue test specimen.

In the test specimen in FIG. 2, the groove bottom of the R3 is equivalent to the stress concentrated region. Similarly, in the test specimen in FIG. 3, the notch bottom of the R3 is equivalent to the stress concentrated region.

Each grooved Ono-type rotating bending fatigue test specimen and each four-point bending test specimen, which were obtained in the above manner, were respectively subjected to the soft-nitriding treatment to retain each test specimen for two hours in an atmosphere where the RX gas and the ammonia gas are mixed at a mixture ratio of 1:1 at a temperature of 600° C.; and thereafter, was cooled in the oil having a temperature of 90° C.

In Test No. 1 to Test No. 12, subsequent to the soft-nitriding treatment, electrolytic grinding was further carried out at the groove bottom of each grooved Ono-type rotating bending fatigue test specimen, and at the notch bottom of each four-point bending test specimen, with a target grinding depth of 0.03 mm under the following conditions.

Electrolytic solution: perchloric acid ($HClO_4$): acetic acid ($CH_3COOH$)=1:9
Current value: 0.14 A
Grinding area:
  Ono-type rotating bending fatigue test specimen: 160 $mm^2$
  Four-point bending test specimen: 96 $mm^2$
Grinding time period:
  Ono-type rotating bending fatigue test specimen: 970 seconds
  Four-point bending test specimen: 590 seconds [0092]

In Test No. 14 to Test No. 16, subsequent to the soft-nitriding treatment, electrolytic grinding was further carried out at the groove bottom of each grooved Ono-type rotating bending fatigue test specimen, and the notch bottom of each four-point bending test specimen, with a target grinding depth of 0.015 mm under the following conditions.

Electrolytic solution: perchloric acid ($HClO_4$): acetic acid ($CH_3COOH$)=1:9
Current value: 0.14 A
Grinding area:
  Ono-type rotating bending fatigue test specimen: 160 $mm^2$
  Four-point bending test specimen: 96 $mm^2$
Grinding time period:
  Ono-type rotating bending fatigue test specimen: 490 seconds
  Four-point bending test specimen: 300 seconds Using the specimens as soft-nitrided (Test No. 13) and the specimens further subjected to the electrolytic grinding after the soft-nitriding treatment (Test No. 1 to Test No. 12, and Test No. 14 to Test No. 16) obtained in the above manner, a study of the bending fatigue strength by the Ono-type rotating bending fatigue test, and a study of the bending straightening property by the four-point bending test were respectively carried out.

In addition, using the specimens as soft-nitrided (Test No. 13) and the specimens subjected to the electrolytic grinding after the soft-nitriding treatment (Test No. 1 to Test No. 12, and Test No. 14 to Test No. 16) for the Ono-type rotating bending fatigue test and the four-point bending test, the surface-layer hardness (i.e., hardness at a position of 0.05 mm from the surface of each specimen), and the internal hardness (i.e., hardness at a position of 1.0 mm from the surface of each specimen) as well as the compound-layer depth at the notch bottom were studied, respectively.

The details of each study will be described, hereinafter.
(1) Study of Bending Fatigue Strength:

The Ono-type rotating bending fatigue test was carried out at a room temperature, in the atmosphere, under completely reversed bending at a rotational rate of 3000 rpm so as to study the bending fatigue strength (referred to as "$\sigma w$", hereinafter).

The target $\sigma w$ was set to be 750 MPa or more.
(2) Study of Bending Straightening Property:

A strain gauge of 2 mm was adhesively bonded to the notch bottom of each four-point bending test specimen, and bending-straightening strain was applied to this specimen until the gauge was broken. A read value of the gauge at the moment when the gauge was broken was evaluated as the bending straightening property.

The target value of the bending straightening property was set to be 22000μ (equivalent to the bending-straightening strain of 2.2%) or more.
(3) Surface-Layer Hardness and Internal Hardness:

Each Ono-type rotating bending fatigue test specimen was embedded in resin in a manner as to set a groove-bottom longitudinal sectional portion at the R3 to be a target surface to be examined, and each four-point bending test specimen was embedded in resin in a manner as to set a notch-bottom longitudinal sectional portion at the R3 to be a target surface to be examined, and then, each target surface was polished to be mirror-finished; and subsequently, the surface hardness and the internal hardness were respectively studied on the target surface of each specimen using a Vickers hardness meter.

Specifically, in conformity to the "Vickers hardness test—Test method" described in HS Z 2244, the HV hardness at any six points at a position of 0.05 mm and at any six points at a position of 1.0 mm from the 3R of the groove bottom, and the HV hardness at any six points at a position of 0.05 mm and at any six points at a position of 1.0 mm from the 3R of the notch bottom were respectively measured for each specimen with a test force of 2.94N using a Vickers hardness meter, and the measured values were arithmetically averaged to evaluate the surface-layer hardness and the internal hardness, respectively.

(4) Compound-Layer Depth:

The compound-layer depth was studied using each of the test specimens embedded in the resin that were used in the above (3).

Specifically, each test specimen embedded in the resin was polished once again, etched with nital, and then any five visual fields at the groove bottom of the R3 and any five visual fields at the notch bottom of the R3 were respectively observed with an optical microscope with magnification of 400×; and portions observed to be white were determined as the "compound layers", and the depths of these layers were measured, and arithmetically averaged as the compound-layer depth.

Results of the above studies are all shown in Table 2.

and the σw does not satisfy the target value of 750 MPa or more; thus this case is poor in bending fatigue characteristics.

In the case of Test No. 11, the Mn content of Steel J that is the steel material of the base metal is more than the range specified by the present invention. Consequently, although the compound-layer depth is as small as 1 μm, the surface-layer hardness of the four-point bending test specimen is as high as 520 in terms of the HV hardness, and the bending straightening property does not satisfy the target value of 22000μ or more in terms of the read value of the gauge; thus this case is poor in bending straightening property.

In the case of Test No. 12, the Cr content of Steel K that is the steel material of the base metal is more than the range

TABLE 2

| | | | Grooved Ono-type rotating bending fatigue test specimen | | | | Four-point bending test specimen | | | |
|---|---|---|---|---|---|---|---|---|---|---|
| Test No. | Steel | Normalizing | Compound-layer depth (μm) | Surface-layer hardness (HV hardness) | Internal hardness (HV hardness) | σw (MPa) | Compound-layer depth (μm) | Surface-layer hardness (HV hardness) | Internal hardness (HV hardness) | Bending straightening property (μ) |
| 1 | A | No | 1 | 458 | 234 | 820 | 1 | 456 | 233 | 26000 |
| 2 | B | No | 3 | 418 | 243 | 800 | 3 | 415 | 240 | 31700 |
| 3 | C | No | 0 | 434 | 237 | 810 | 0 | 430 | 235 | 29400 |
| 4 | D | No | 2 | 458 | 245 | 820 | 2 | 461 | 244 | 25500 |
| 5 | E | No | 0 | 418 | 220 | 790 | 0 | 414 | 220 | 32000 |
| 6 | F | No | 0 | 464 | 246 | 830 | 0 | 462 | 246 | 25100 |
| 7 | G | No | 2 | 453 | 229 | 820 | 2 | 455 | 228 | 26700 |
| 8 | A | Yes | 1 | 428 | 214 | 770 | 1 | 427 | 212 | 30200 |
| 9 | *H | No | 2 | 457 | #187 | #690 | 2 | 460 | #189 | 26100 |
| 10 | *I | No | 1 | #332 | 203 | #600 | 1 | #333 | 202 | 44000 |
| 11 | *J | No | 1 | #526 | 271 | 840 | 1 | #520 | 274 | #16200 |
| 12 | *K | No | 3 | #520 | 254 | 840 | 2 | #518 | 255 | #17100 |
| 13 | B | No | #19 | 448 | 242 | 820 | #20 | 443 | 242 | #15400 |
| 14 | C | No | #12 | 455 | 236 | 810 | #11 | 449 | 236 | #18700 |
| 15 | F | No | #9 | 480 | 246 | 820 | #8 | 480 | 244 | #16400 |
| 16 | G | No | #8 | 471 | 230 | 820 | #8 | 470 | 231 | #12000 |

Normalizing conditions are such that the heating temperature: 880° C., and the retaining time period: 60 minutes.
A mark (*) represents deviation from the chemical composition specified by the present invention.
A mark (#) represents that the value does not satisfy the target value.

As shown in Table 2, in the cases of Test No. 1 to Test No. 8 that satisfy the conditions specified by the present invention in the chemical composition of the steel material of the base metal, the surface-layer hardness, the internal hardness, and the compound-layer depth at the stress concentrated region, it is apparent that the target values of the σw and the bending straightening property were both satisfied, and these cases are excellent in bending fatigue characteristics and bending straightening property.

To the contrary, in the cases of Test No. 9 to Test No. 12, the respective chemical compositions of Steel H to Steel K deviate from the conditions specified by the present invention, and thus these cases are poorer in bending fatigue characteristics or bending straightening property.

Specifically, in the case of Test No. 9, the C content of Steel H that is the steel material of the base metal is less than the range specified by the present invention. Consequently, the internal hardness of the Ono-type rotating bending fatigue test specimen is as low as 187 in terms of the HV hardness, and the σw does not satisfy the target value of 750 MPa or more; thus this case is poor in bending fatigue characteristics.

In the case of Test No. 10, the Mn content of Steel I that is the steel material of the base metal is less than the range specified by the present invention. Consequently, the surface-layer hardness of the Ono-type rotating bending fatigue test specimen is as low as 332 in terms of the HV hardness, specified by the present invention. Consequently, although the compound-layer depth is as small as 2 μm, the surface-layer hardness of the four-point bending test specimen is as high as 518 in terms of the HV hardness, and the bending straightening property does not satisfy the target value of 22000 μ or more in terms of the read value of the gauge; thus this case is poor in bending straightening property.

In the cases of Test No. 13 to Test No. 16, the compound-layer depth of the four-point bending test deviates from the condition specified by the present invention; thus these cases are poor in bending straightening property.

In the case of Test No. 13, although Steel B that is the steel material of the base metal has chemical composition within the range specified by the present invention, the compound-layer depth of the four-point bending test specimen is as high as 20 μm, and the bending straightening property does not satisfy the target value of 22000μ or more in terms of the read value of the gauge; thus this case is poor in bending straightening property.

In the case of Test No. 14, although Steel C that is the steel material of the base metal has chemical composition within the range specified by the present invention, the compound-layer depth of the four-point bending test specimen is as high as 11 μm, and the bending straightening property does not satisfy the target value of 22000μ or more in terms of the read value of the gauge; thus this case is poor in bending straightening property.

In the case of Test No. 15, although Steel F that is the steel material of the base metal has chemical composition within the range specified by the present invention, the compound-layer depth of the four-point bending test specimen is as high as 8 μm, and the bending straightening property does not satisfy the target value of 22000μ or more in terms of the read value of the gauge; thus this case is poor in bending straightening property.

In the case of Test No. 16, although Steel G that is the steel material of the base metal has chemical composition within the range specified by the present invention, the compound-layer depth of the four-point bending test specimen is as high as 8 μm, and the bending straightening property does not satisfy the target value of 22000μ or more in terms of the read value of the gauge; thus this case is poor in bending straightening property.

INDUSTRIAL APPLICABILITY

The non-thermal refined soft-nitrided component of the present invention is excellent in bending straightening property after the soft-nitriding treatment, and has a bending fatigue strength as high as 750 MPa or more in the bending fatigue test; therefore, this non-thermal refined soft-nitrided component is usable as a component, such as a crankshaft, in automobiles, industrial machines, or construction machinery, and this component is capable of attaining reduction in weight and size.

The invention claimed is:

1. A non-thermal refined soft-nitrided component having a compound layer in a surface layer of a steel material of a base metal, chemical composition of the steel material of the base metal containing: in mass %,
   C: 0.25 to 0.40%;
   Si: 0.10 to 0.35%;
   Mn: more than 2.0% to 2.8% or less;
   N: 0.0030 to 0.0250%;
   Cu: 0 to 1.0%;
   Mo: 0 to 0.3%;
   Ni: 0 to 0.5%;
   Ti: 0 to 0.020%; and
   a balance being Fe and impurities, the impurities including P: 0.08% or less; S: 0.10% or less; Al: 0.05% or less; and Cr: less than 0.20%,
   wherein
   an HV hardness at a position of 0.05 mm from the surface is 400 to 480,
   an HV hardness at a position of 1.0 mm from the surface is 200 or more,
   and
   a compound-layer depth at a stress concentrated region is 5 μm or less.

2. The non-thermal refined soft-nitrided component according to claim 1, wherein
   the steel material of the base metal contains, in mass %, one or more types of elements selected from Cu: 0.05 to 1.0% and Mo: 0.05 to 0.3%.

3. The non-thermal refined soft-nitrided component according to claim 1, wherein
   the steel material of the base metal contains, in mass %, one or more types of elements selected from Ni: 0.05 to 0.5% and Ti: 0.005 to 0.020%.

* * * * *